(12) United States Patent
Forster et al.

(10) Patent No.: US 7,446,493 B2
(45) Date of Patent: Nov. 4, 2008

(54) CONTROL METHODOLOGIES FOR A MOTOR CONTROL MODULE

(75) Inventors: Michael K. Forster, White Hall, MD (US); Jason K. Leh, Parkville, MD (US); John C. Vanko, Timonium, MD (US); Daniel R. Beers, Dallastown, PA (US); Robert A. Usselman, Forest Hill, MD (US); Zoran Mihailovic, Vestal, NY (US)

(73) Assignee: Black & Decker Inc., Newark, DE (US)

( * ) Notice: Subject to any disclaimer, the term of this patent is extended or adjusted under 35 U.S.C. 154(b) by 199 days.

(21) Appl. No.: 11/545,734

(22) Filed: Oct. 11, 2006

(65) Prior Publication Data

US 2007/0093928 A1    Apr. 26, 2007

Related U.S. Application Data

(60) Provisional application No. 60/726,011, filed on Oct. 12, 2005, provisional application No. 60/817,085, filed on Jun. 29, 2006.

(51) Int. Cl.
    *H02P 6/00* (2006.01)
(52) U.S. Cl. .................. 318/400.35; 318/700; 318/727; 318/400.22
(58) Field of Classification Search .................. 318/700, 318/727, 400.35, 400.22, 400.23, 400.24
    See application file for complete search history.

(56) References Cited

U.S. PATENT DOCUMENTS

| 5,945,853 | A | 8/1999 | Sano | |
|---|---|---|---|---|
| 5,986,417 | A | 11/1999 | Nicolai et al. | |
| 2003/0129063 | A1* | 7/2003 | Jeun | 417/45 |

FOREIGN PATENT DOCUMENTS

| EP | 1 473 825 A | 11/2004 |
|---|---|---|
| JP | 06 062593 A | 3/1994 |
| JP | 07-333260 | 12/1995 |
| WO | WO 2004/073003 A2 | 8/2004 |

OTHER PUBLICATIONS

European Search Report issued Nov. 2, 2007 in corresponding European Patent Application No. 07114561.9.
European Search Report issued Feb. 22, 2007 in corresponding European Patent Application No. 06122174.

* cited by examiner

*Primary Examiner*—Karen Masih
(74) *Attorney, Agent, or Firm*—Harness, Dickey & Pierce, P.L.C.

(57) ABSTRACT

A motor control module for a power tool includes a controller and a triac for controlling current to the given tool motor. The module includes a circuit within the controller for implementing a plurality of control methodologies related to synchronizing the module to the AC input signal, estimating average current flowing through the triac, compensating for amplifier offset to improve accuracy of current measurements in the module, and providing speed measurement and control for the tool motor using principles of hysteresis in a comparator of the controller. Additionally, the controller is configured to calibrate an oscillation calibration register therein.

14 Claims, 13 Drawing Sheets

CONTROL METHODOLOGIES FOR A MOTOR CONTROL MODULE

PRIORITY STATEMENT

This application claims the benefit under 35 U.S.C. §119 (e) to U.S. Provisional Patent Applications Ser. No. 60/726,011, filed Oct. 12, 2005 to Samuel G. WOODS et al. and entitled "UNIVERSAL CONTROL MODULE", and Ser. No. 60/817,085, filed Jun. 29, 2006 to Samuel G. WOODS et al. and entitled "CONTROL AND PROTECTION METHODOLOGIES FOR MOTOR CONTROL MODULE". The entire contents of each provisional application are hereby incorporated by reference herein.

BACKGROUND

1. Field of the Invention

Example embodiments in general relate to a motor control module and control methodologies for controlling operation of a motor in an associated electrical device such as a power tool.

2. Description of the Related Art

Typically, motors are controlled by dedicated analog or digital circuitry controlling the motor for a given application. For example, a dedicated circuit may be required to control a given motor utilized in an application for an electrical device such as a power saw application, while another dedicated circuit may be required to control a different motor utilized in another power tool application such as a drill application. The dedicated analog or digital control circuit is typically constructed of different components. These components often have differing values, tolerances and/or control software to create a unique operational characteristic profile for a given motor and/or given motor application.

SUMMARY

Example embodiments are directed to a motor control module which may implement a number of control methodologies to control operation of a motor in an electrical device, such as a tool motor of a corded power tool. The module includes a controller and a triac for controlling current to the given tool motor. The module can implement a plurality of control methodologies, including methodologies related to synchronizing the module to the AC input signal, estimating average current flowing through the triac, compensating for amplifier offset to improve accuracy of current measurements in the module, and providing speed measurement and control for the tool motor using principles of hysteresis in a comparator of the controller. Additionally, the controller is configured to calibrate an oscillation calibration register therein.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION OF THE EXAMPLE EMBODIMENTS

As to be described in detail hereafter, example embodiments are directed to control methodologies implemented by an electronic circuit within a motor control module of an electronic device. In one example, the electronic device may be a corded power tool having a tool motor powered by an AC source voltage for driving a work piece or accessory of the power tool. The example embodiments hereafter describe control methodologies performed by the circuit within the control module as related to and including, but not limited to: a method of detecting triac conduction following triac firing in the circuit, a method of detecting zero crosses of the AC waveform supplied to the power tool. In order to provide context for the example methodologies described hereafter, the inventors initially provide an overview of an example power device with control module, and an example block diagram of the control module's electronics.

Figure 1:
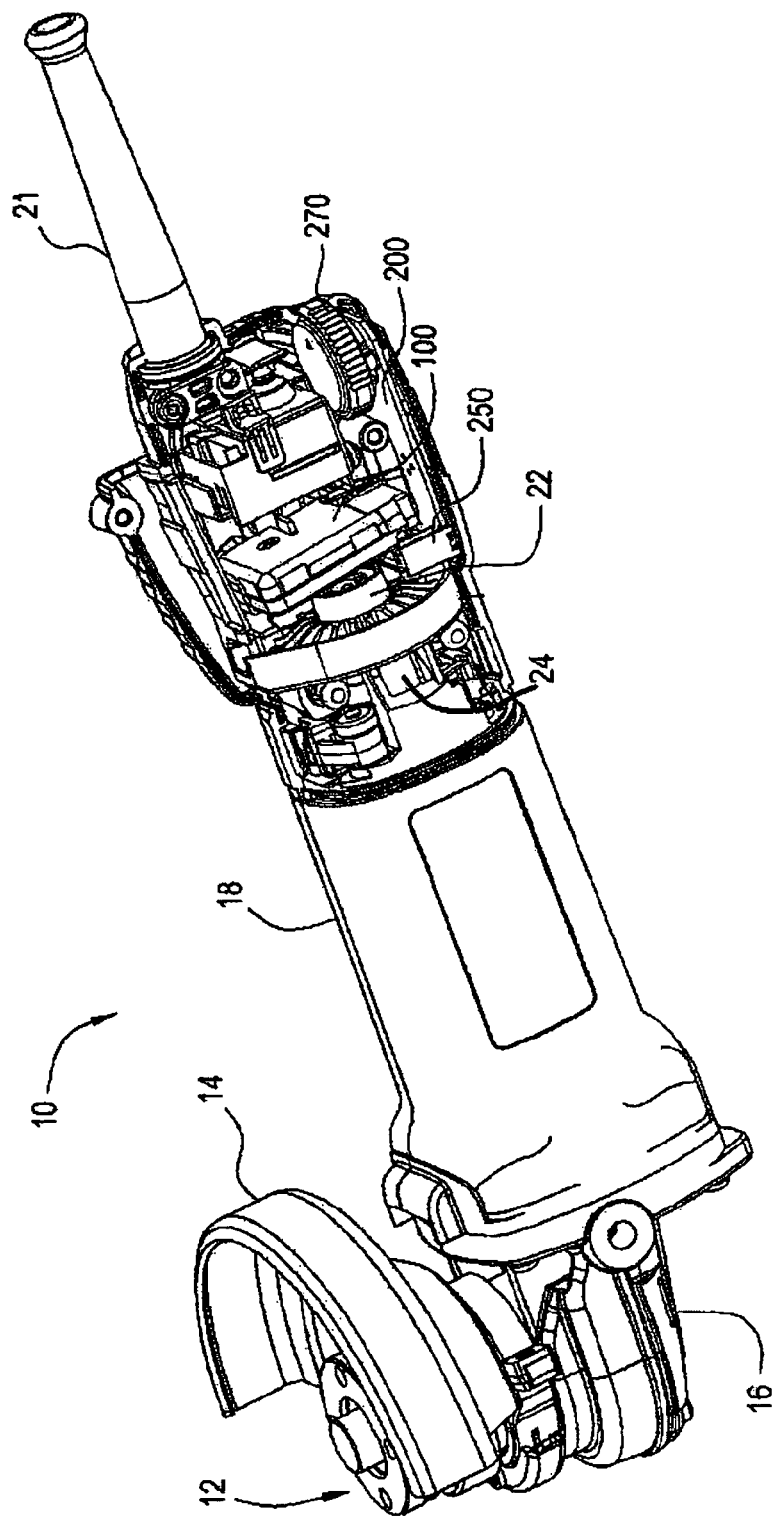
FIG. 1 is a partial plan view of a power tool illustrating the control module within the tool housing, in accordance with an example embodiment.

FIG. 1 is a partial plan view of a power tool illustrating a control module within a housing of the tool, in accordance with an example embodiment. Referring to FIG. 1, power tool 10 is shown embodied as a rotary, corded power tool 10, it being understood that the example embodiments are applicable to power tools other than rotary, corded power tools. In the example of FIG. 1, power tool 10 is shown as an angle grinder powered by AC line power via a power cord 21. The angle grinder 10 includes a knurled clamp nut 12 within an accessory guard 14 for receiving a tool workpiece or accessory powered by the tool motor. In this example, the accessory may be a rotary accessory such as grinding disc (not shown). The grinding disc is attachable via a spindle to gear case 16, which is secured to tool housing 18.

Tool housing 18 is shown with part of the outer shell removed, so as to illustrate a universal control module 100 ('control module') in proximate relationship to a magnetic collar 22 and a commutator ring 24 of a motor armature 20. The control module 100 is designed for controlling the operation of a plurality of motors and/or configured for a plurality of different motor applications (e.g. different power tools).

Additionally in FIG. 1, there is shown an auxiliary board 200 supporting a pick-up coil assembly 250 and a variable speed dial wheel 270. As part of an assembly connected to the control module 100 within the power tool 10, the auxiliary board 200 may be included within the tool housing 18. One function of the auxiliary board 200 is it allows custom configuration of pick-up coil and variable speed dial as dictated by power tool design requirements. The pick-up coil assembly 250 is attachable to the auxiliary board 200 and configured to detect motor speed. The variable speed dial wheel 270 is operable by the user in order to set and/or change to the desired motor speed.

Figure 2:
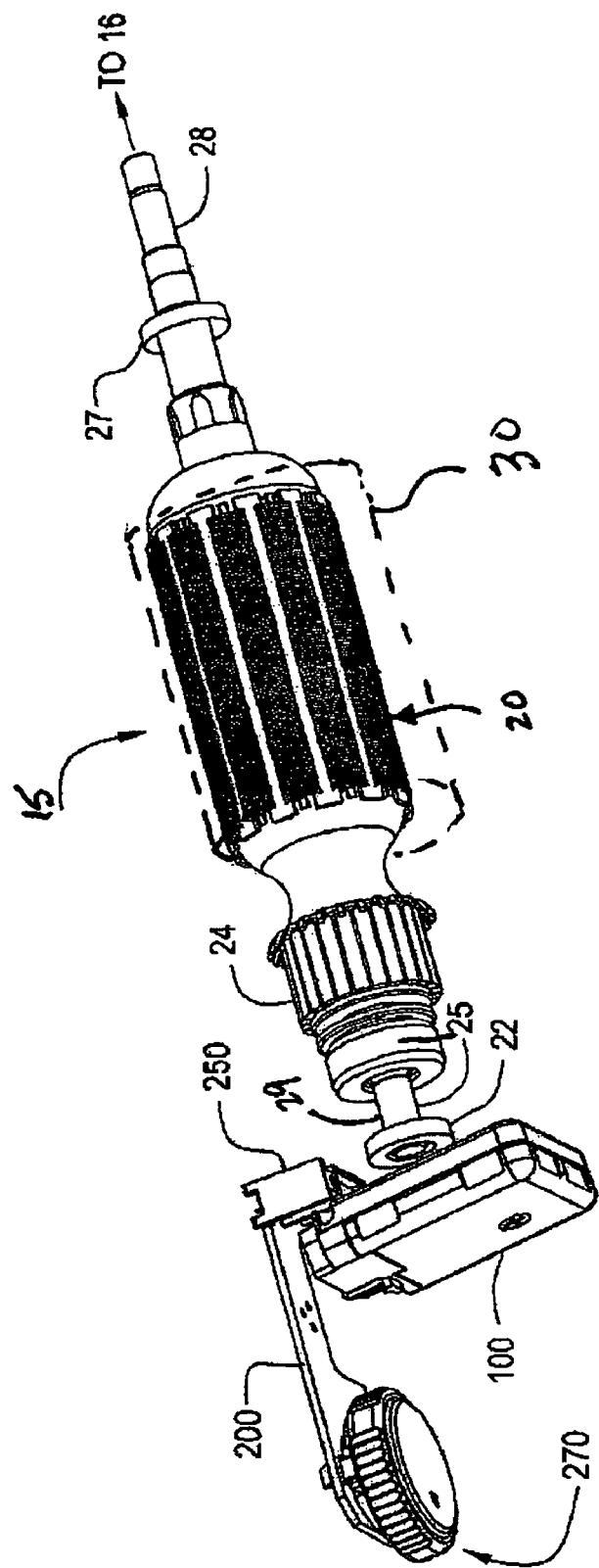
FIG. 2 is an isometric view of selected components of the tool motor within the power tool to illustrate the relation of the control module, pick-up coil assembly, auxiliary board and speed dial, in accordance with an example embodiment.

FIG. 2 is an isometric view of selected components of the tool motor within the power tool to illustrate the relation of the control module, pick-up coil assembly, auxiliary board and speed dial, in accordance with an example embodiment. FIG. 2 illustrates the relationship between the auxiliary board 200 and its components (pick-up coil assembly 250 and speed dial 270), the control module 100 and the tool motor 15, which may be comprised of a tool motor armature 20 rotating within a tool motor field 30. In an example, the auxiliary board 200, pick-up coil assembly 250 and dial wheel 270 may be collectively referred to as an auxiliary circuit board assembly. The auxiliary circuit board assembly is attached to the control module 100 of FIG. 1, for example, with the control module 100 being adapted to control operation of the tool motor.

The tool motor armature 20 includes the magnetic collar 22 attachable via armature shaft 29 to the commutator ring 24 of the motor armature 20. The motor armature 20 output is translated to the gear case 16 via ball bearing 27 and spindle 28. Multiple magnets may be provided on the magnetic collar 22 of the motor armature 20. As the armature 20 rotates, the magnetic field from the magnets is picked up by the pick-up coil assembly 250 to give an accurate reading of motor speed. As discussed above, the complete tool motor 15 consists of tool motor armature 20 rotating within tool motor field 30.

The auxiliary board 200 may also include the variable speed dial wheel 270, which acts as a potentiometer as is known in the art. In an example, a portion of the dial wheel 270 may include a plurality of rigid detents which sit on points of a leaf spring, so as to provide aural feedback to the user. In an example, the detents contact the leaf spring to provide a tactile feedback to the user. This also serves to prevent the dial wheel 270 from moving during any tool vibration. Additionally, the use of detents may prevent the user from inadvertently changing speed, providing a readily discernible tactile feedback to the user.

Figure 3:
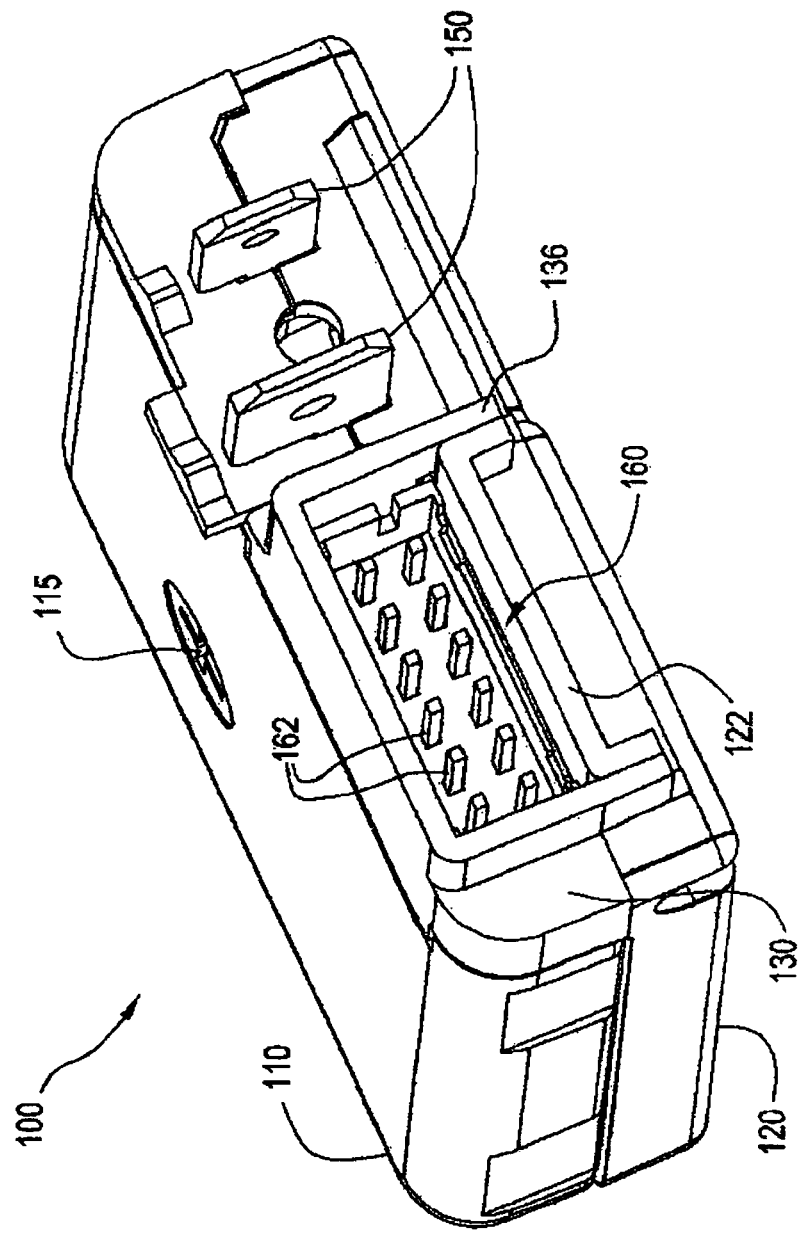
FIG. 3 is an isometric view of the control module in accordance with an example embodiment.

FIG. 3 is an isometric view of the control module 100 in accordance with an example embodiment. Referring to FIG. 3, the control module 100 includes a top cover 110, a bottom cover 120, a spacer 130 and a printed circuit board 140 (not shown in FIG. 3). In one example, the top cover 110 may be made of a material that provides heat sinking for active power components within the control module 100, and may be cast for that function, for example. The bottom cover 120 may be configured to support control module 100 interior components and to permit potting so as to create a sealed enclosure. Additionally, the bottom cover 120 provides an area of electrical insulation for an active power device within the control module 100.

The spacer 130 may be configured to hold through-hole electronic components within the control module 100 in place, such as during assembly of the control module 100. The control module 100 also may include a fastener 115 (e.g., a screw) that fastens the top cover 110 to a nut (not shown) within the module 100. The fastener 115 may be fastened to an active power device such as a switch, a triac, electronic valve, etc., within control module 100. The top and bottom covers 110, 120 may therefore be secured together via a single fastener 115 such as a screw and nut assembly.

The control module 100 also includes a pair of quick-connect power tabs 150 and an input/output connector 160 connected to the printed circuit board 140. The quick connect power tabs 150 are sequenced to the control module 100 and may be of a different size and different length to prevent improper connection to other components, for example. In an example, the input/output connector 160 may be configured in a 12-pin arrangement, in which four (4) pins 162 are empty and not used (to provide spacing), five (5) of the pins 162 may be input/output pins, one (1) pin 162 may be a hot-wire pin and one (1) pin 162 may be a circuit ground/neutral pin. This is merely one terminal pin arrangement for input/output connector 160; other arrangements are foreseeable to the skilled artisan in accordance with the example embodiments herein.

As discussed above, the spacer 130 holds through-hole electronic components in place during assembly of the control module 100. During fabrication, there is a plurality of electronic components attached to the PCB 140. One function of the spacer 130 is to maintain components in place during wave soldering to eliminate hold down fixtures. Accordingly, the spacer 130 may be placed over the power tabs 150 during assembly to provide tolerances and also to provide electrical insulation while maintaining these tolerances between components.

The spacer 130 includes a shroud portion 136 which mates onto a tab 122 of the bottom cover 120 so as to seal and enclose the input/output connector 160. The shroud portion 136 of spacer 130 may be designed to prevent debris and dust shavings from entering the control module 100's active components.

Additional isolation may be provided by potting (not shown) in the spacer 130. In addition to holding active components within control module 100 in place, the potting material may have a V0 flammability rating. Suitable potting materials include but are not limited to one or more of an epoxy-based encapsulant, a single or multi-component urethane or urethane gel encapsulant, a single or multi-component silicon or silicon gel encapsulant, etc.

Accordingly, having potting as an insulator distinguishes the control module 100 with a single layer of isolation versus a non-isolated control module, for example. Additionally, thermal grease may be applied to the top surface of an active electronic component such as a FET or triac within the module 100; this is standard in the industry. In an alternative, a thermal pad (not shown) may be provided instead of the thermal grease. The thermal grease or thermal pad may be used to prevent the potting from seeping between a given active electronic component and the top cover 110, and may be sized as a function of active component height, for example.

Figure 4:
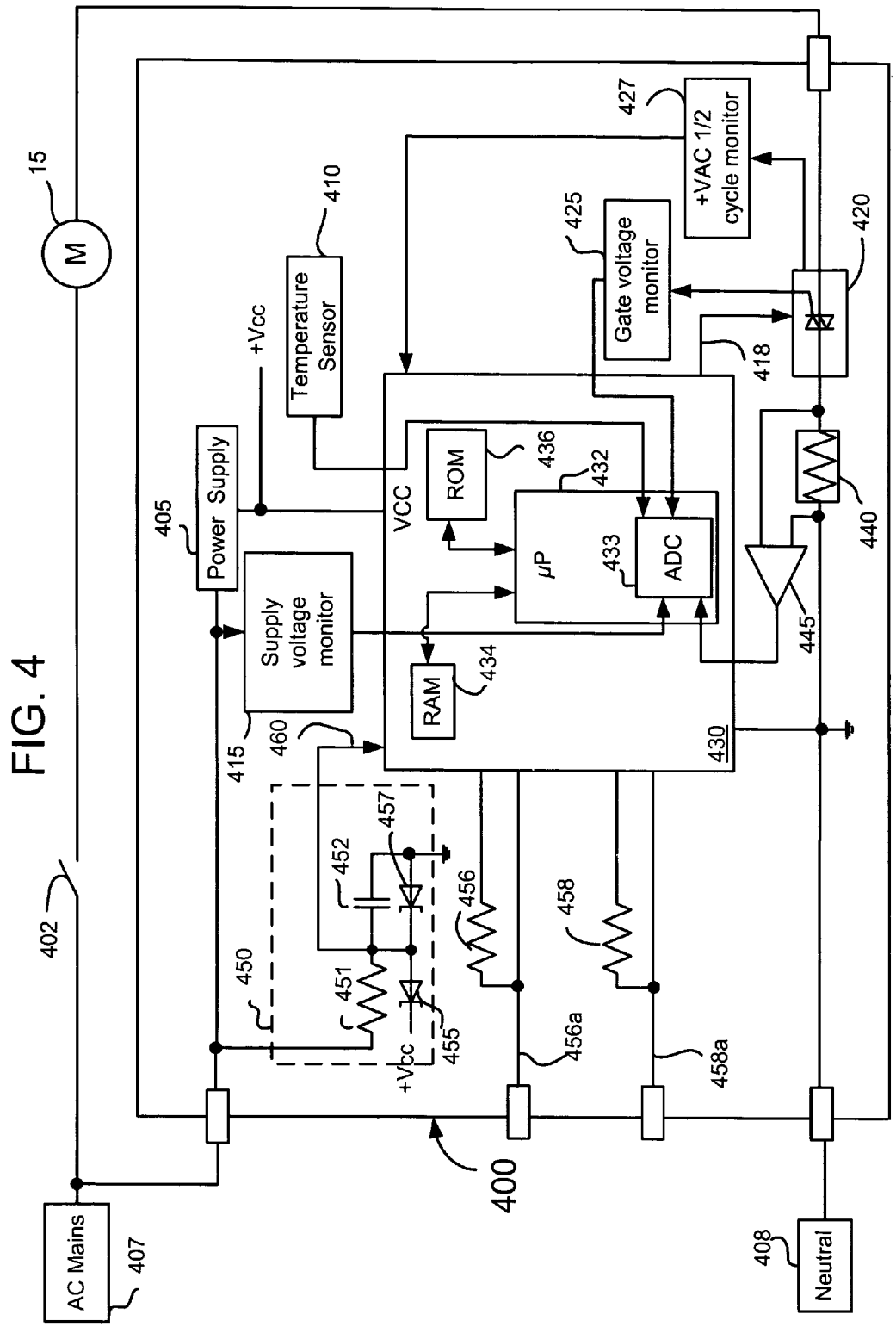
FIG. 4 is a block diagram of an electronic component arrangement within the control module in accordance with an example embodiment.

FIG. 4 is a block diagram of an electronic component arrangement within control module 100. The electronic components described hereafter may be arranged as part of a control circuit 400 on the PCB 140 within the control module 100. The control circuit 400 of the module 100 includes memory 434, 436 for storing one or more soft-coded function coefficients used during execution of various control functions or algorithms. Since a given soft-coded function coefficient may be specific to a particular tool application, the control module 100 may be suitable for controlling the operation of a plurality of motors and/or for a plurality of different motor applications (e.g. different power tools).

The soft-coded coefficients can be understood to include coefficient inputs into a given function or algorithm to be performed by the control module 100, and can include function coefficients that may be changed or varied for a given tool or tool application. The soft-coded coefficients also include coefficient outputs related to a control and/or protective action to be taken by the control module 100 as a result of implementing the given function or algorithm in the control module 100. Coefficient inputs to, and coefficient outputs from a given function may be changed or linked as desired for a given application.

Control module 100 is connectable to an AC power source (AC Mains 407) and to the motor armature 20 and tool motor field 30. In an example, the tool motor armature 20 and the tool motor field 30 may comprise an AC motor 15. The control module 100 includes the control circuit 400 therein. The control circuit 400 determines a position of a motor control switch 402 and controls the control module 100 if power is provided to the motor armature 20 and motor field 30 based on the position of the motor control switch 402 when the AC power source is applied.

The control circuit 400 includes a power supply 405 that supplies power to a microcontroller 430 programmed to control certain operations and/or to direct certain functions or protective actions within module 100. The power supply 405 may supply a VCC of 5V for example. A supply voltage monitor 415 monitors the VCC and provides a sensed input to microcontroller 430.

The microcontroller 430 can control the triac 420 by providing a gate firing signal via line 418 to the triac 420. Although shown as a triac 420, this type of electronic valve may be embodied as any of a field effect transistor (FET), an insulated gate bipolar transistor (IGBT), a silicone-controlled rectifier (SCR), a voltage control device, etc. Generally, the control module 100 controls the operation of the motor 15 by switching the AC supply voltage 407 to the motor at periodic intervals in relation to the zero crossing of the AC current or voltage waveform, via the microcontroller 430 and gate firing signals applied to the gate of the electronic valve 420 via line 418. These periodic intervals are caused to occur in synchronism with the AC waveform (i.e., the AC supply signal input from AC mains 407) and are measured in terms of a conduction angle, expressed as a number of degrees.

The conduction angle determines the point within the AC waveform, for both positive and negative half-cycles, at which the electronic valve 420 is fired, thereby delivering electrical energy to the motor 15. For example, a conduction angle of 180° per half cycle corresponds to a condition of full conduction, in which triac 420 is fired such that the entire, uninterrupted alternating current from AC mains 407 is applied to the motor 15, i.e., the triac 420 is fired such that current flows through the triac 420 for each positive and negative half cycle of the AC input signal. Similarly, a 90° conduction angle corresponds to developing the AC supply voltage across the motor 15 commencing in the middle of a given half cycle, and thus the triac 420 is fired so that approximately half of the available energy is delivered to the motor. Conduction angles below 90° correspond to firing of the triac 420 later in a given half cycle so that even lesser quantities of energy are delivered to the motor 15.

In an example, the triac 420 may be a single-isolated triac, where isolation is internal to the part. More specifically, operation of the motor armature 20 and motor field 30 which constitute the motor 15 is controlled by the control circuit 400 within control module 100. To control operation of the motor armature 20 and motor field 30, the microcontroller 430 controls the current flowing through or voltage applied to motor armature 20 and motor field 30, or both, via electronic cycling of the triac 420. In one example, the control circuit 400 can determine when to open or close the triac 420 based on soft-coded coefficients that can be stored in look-up tables, or from control equations or control methodologies based upon measured factors or parameters such as voltage, speed, current, torque, other external digital inputs (456a, 458a etc.) or any combination of the above. A triac 420 is one type of controlled switching device which cannot be 'opened' or turned off by the control circuit 400. However, other devices such as FET's, IGBT's etc, can be turned off. The turn-off of the triac 420 is decided by the AC and motor 15, which causes the current to reduce to zero to thereby allow the triac 420 to turn-off at each AC half-cycle. This does not reduce the control capability of the triac 420 relative to the methodologies referred to herein.

The control module 100 controls the operation of the motor 15 when the motor control switch 402 is placed in a closed (i.e., 'on') position, thereby allowing current to flow through. A function of the control circuit 400 is to monitor the position of the motor control switch 402 and prevent starting of the motor 15 if power is applied to motor 15 with the motor control switch 402 in a shut (i.e. 'On') position.

Microcontroller 430 may include one or more memory elements. Microcontroller 430 may include program ROM 436 (alterable ROM) such as flash memory, a CPU core such as a microprocessor 432, on-board peripherals, and volatile memory such as RAM 434 or SRAM on a single chip construction, for example. Examples of volatile memory include RAM (DRAM, SRAM, SDRAM, VRAM, etc. Non-volatile memory such as Electrically Erasable Programmable Read-Only Memory (EEPROM) and Flash memory allows the entire ROM (or selected banks of the ROM) to be electrically erased (flashed back to zero) then written to.

In an example, the microcontroller 430 may be one of the ATMEL AVR® 8-bit RISC microcontrollers, such as the ATmega8 flash microcontroller with 8-Kbyte self-programming Flash Program Memory (EEPROM). In the examples described hereafter, ROM 436 may be referring to as non-volatile memory such as flash memory EEPROM or simply EEPROM 436.

However the module 100's intelligent control is not limited to the example microcontroller 430. The intelligent control device could be embodied in hardware and/or software as another microprocessor, an analog circuit, a digital signal processor or by one or more digital ICs such as application specific integrated circuits (ASICs), for example.

The control circuit 400 with the tool motor 15 (motor armature 20 and motor field 30) is connected in series with motor control switch 402, triac 420 and a shunt resistor 440 between hot and neutral (common) sides of the power source.

In FIG. 4, one side of tool motor 15 is connected to the power source, such as to the hot side of AC mains 407 via the power cord 21 (FIG. 1) through the motor control switch 402. The other side of the tool motor 15 is connected through triac 420, shunt resistor 440 and power cord 21 to the neutral side 408 of the AC mains 407.

Shunt resistor 440 may be embodied as an analog current sensor which senses current through the triac 420 and motor 15 and provides a representative low-voltage signal that is amplified at amplifier 445. Amplifier 445 has a first input coupled to one side of shunt resistor 440 and a second input coupled to the other side of shunt resistor 440. In an example, amplifier 445 may be biased (i.e., a bias voltage may be applied at the input so as to shift the amplifier output). An output of amplifier 445 may be coupled to a given port of microcontroller 430. Shunt 440 is merely one example of a current sensor, alternative current sensors include current transformers, digital sensors, hall-effect sensors, etc., for example.

The microcontroller 430 may include an analog to digital converter (ADC) 433. ADC 433 may be embedded as part of the circuitry of microprocessor 432 and converts analog signals received from various sensors or sources to digital representations for processing by microprocessor 432. As shown, example analog inputs include inputs from amplifier 445, monitors 415 and 425, power supply 405 and temperature sensor 410. These inputs may be converted to digital representations in the ADC 433 as is known for processing by the microprocessor 432. The output from the RC filter formed by 451/452 is a digital input to the microcontroller 430, as is the input from voltage monitor 427. Lines 456 and 458 represent digital outputs from the microcontroller 430, and lines 456a and 458a can be digital inputs, analog inputs or even digital outputs. The microcontroller 430 outputs a digital gate firing signal (control signal) via line 418 to control firing of the triac 420.

The control circuit 400 further includes a voltage shaping circuit 450 clamped by diodes 455 and 457 and including an RC filter represented by resistor 451 and capacitor 452. The resulting signal input 460 that is output of the voltage shaping circuit 450 is utilized by microcontroller 430 to sense a point in time where the theoretical, ideal sinusoidal AC voltage signal (the AC supply from AC mains 407) crosses the zero-axis and switches from either a positive-to-negative or negative-to-positive voltage. This point is used for timing and synchronization purposes inside the microcontroller 430 of control module 100

The clamping diodes 455 and 457 protect microcontroller 430 from damage if a voltage spike occurs in the AC source voltage. In an example, all or part of the voltage shaping circuit 450 may be included in the control circuit 400 or within microcontroller 430. In one example, the clamping diodes 455 and 457 are internal to the microcontroller 430.

Control circuit 400 may include one or more temperature sensors 410 designed to sense a temperature and to input a sensed signal via a port to microcontroller 430. Only one sensor 410 is shown for clarity. Temperature sensor 410 may be embodied as an NTC or PTC thermistor, temperature sensing IC or thermocouple, for example. The temperature sensor 410 may communicate the temperature of the control module 100, or the temperature of specific components such as the triac 420 or microcontroller 430. As the function of such temperature sensors 410 are known, a detailed explanation of its functional operation is omitted for purposes of brevity. Multiple temperature sensors 410 could be placed at designated locations within module 100 as required.

Additionally, the control circuit 400 includes two voltage monitors for monitoring voltage of the triac 420, a gate voltage monitoring circuit (monitor 425) for monitoring a gate voltage of the triac 420 to determine if the triac 420 is conducting during a negative AC half-cycle of the AC waveform applied to triac 420, and a positive VAC half cycle monitoring circuit (monitor 427) which is used to monitor triac voltage to determine if the triac 420 is conducting during the positive AC half cycle.

The triac gate voltage monitor 425 includes circuitry for monitoring both the positive and negative AC half cycles, yet software in the microcontroller 430 doesn't utilize the gate voltage monitor 425 in the positive half cycle due to measurement functions performed in the ADC 433. Accordingly, both monitors 425, 427 are used as the microcontroller 430 cannot use the gate voltage monitor 425 during the triac 420/motor current measurement, which is fully utilizing ADC 433 during the positive half cycle. During the negative half wave of the AC cycle, no voltage would be detected by monitor 427, which inputs a digital signal to microcontroller 430. Additionally, both monitors 425, 427 are used for detecting whether triac 420 is conducting following firing, as will be described in further detail below.

In general, the control circuit 400 of FIG. 4 is designed to enable module 100 to provide control for the tool motor 15. Accordingly, as the general structure and electronic circuitry of the control module 100 has been described, example control methodologies are discussed in more detail below.

Triac Conduction Detection

In traditional analog triac AC motor controls, re-firing of the triac 420 is required to ensure that the triac 420 is turned back on if the current to a tool motor momentarily goes to zero (either due to a fault event in the electrical supply system (such as a voltage disturbance on the AC supply from AC Mains 407) or due to the motor commutator interrupting current for a brief interval) during a particular AC half-cycle. This occurrence can happen frequently, if the motor (such as motor 15) is a typical universal motor having a commutator where the motor current can quickly decay to zero during the commutation process, or if the brushes bounce away from the commutator.

A conventional analog AC motor control system for determining whether the triac 420 has turned off after being fired only monitors the triac gate voltage to determine whether the triac is 'on' or 'off' (i.e. 'on' when the voltage is positive and above some threshold, or negative and below a threshold). However, in a conventional digital system where resources are limited (as in the case of control circuit 400) it is typically not possible to monitor the triac gate voltage for the entire AC cycle. For example, during the positive AC half-cycle, the triac AC current needs to be measured, and as a result, the gate voltage for determining whether the triac has re-fired cannot be measured by the same analog-to-digital converter (ADC), such as ADC 433. During the negative AC half-cycle, the triac gate voltage can be monitored by the same ADC, as the current is negative and does not need to be measured (i.e. it is assumed to be the same as the positive half-cycle). Therefore, it is possible to perform triac conduction detection only in the negative AC half-cycle.

Accordingly, in an example embodiment, a triac conduction detection algorithm may be implemented by the microprocessor 432 of microcontroller 430 in which triac conduction detection may be performed in both half-cycles of the AC waveform. In general, the methodology checks each AC half cycle for whether or not the triac 420 is conducting after it has been fired in accordance with a given control algorithm. The algorithm compares actual samplings of triac voltage/gate voltage taken by the two voltage monitoring circuits 425 and 427 against expected states to make a triac 420 on/off determination in each half cycle of the AC supply signal.

Triac gate voltage monitor 425 monitors the negative AC half cycle and positive VAC ½ cycle voltage monitor 427 monitors the positive AC half cycle of the triac voltage. In general, after a zero-cross that indicates the beginning of a half-cycle, and after a given delay has elapsed (the delay is provided to wait for the known, given control algorithm to fire the triac 420 in the given AC half-cycle), if it is determined based on the sampled voltage value that the triac 420 is not conducting after it has fired, control module 100 attempts to re-fire the triac 420. This check may be repeated several times at given intervals up to some minimum conduction point (i.e., such as until a 30 degree conduction angle is exceeded—in both the positive and negative half cycles of the AC waveform. This point represents the last 30 degrees in the 180 degree half-sine wave cycle.

If it is determined that the triac 420 is not conducting upon reaching the minimum conduction point, the triac 420 is not fired or re-fired for the remainder of the half-cycle. By checking up to the minimum conduction point whether the triac 420 fired or not, the triac 420 has either failed due to some fault condition or the switch 402 is open if it has not yet fired.

If a continuous number of AC line cycles are observed where the triac 420 has failed to conduct, then the switch 402 is considered to be open. This enables the ability to detect an open switch 402 without the need of a current measurement circuit.

Figure 5:
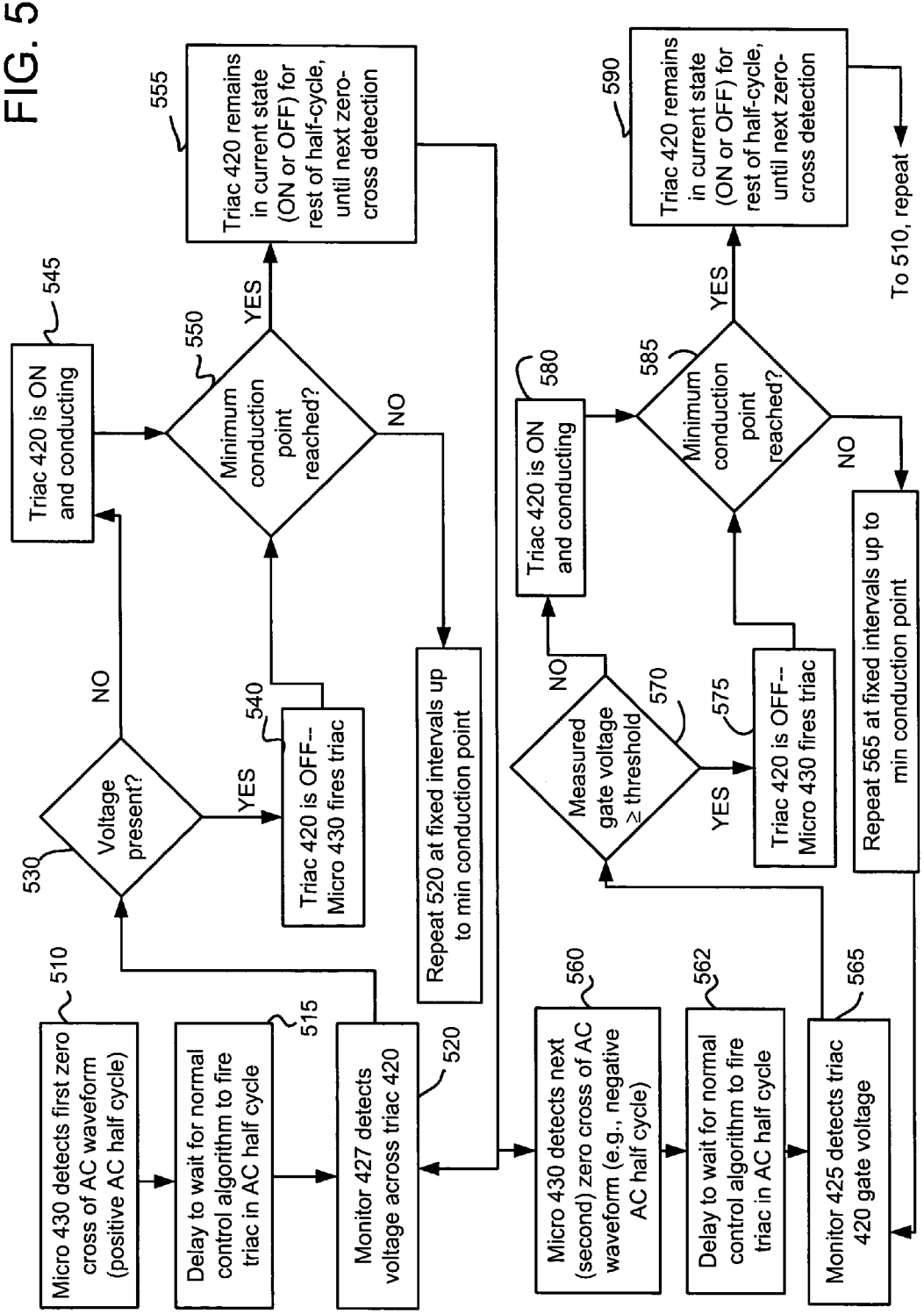
FIG. 5 is a flow diagram for illustrating a method of detecting whether the triac 420 needs to be re-fired in the control module 100 following an initial firing of the triac 420 from a given control methodology.

FIG. 5 is a flow diagram for illustrating a method of detecting whether the triac 420 needs to be re-fired in the control module 100 following an initial firing of the triac 420 from a given control methodology. A typical control methodology implemented in the control module 100 requires a given conduction angle which sets the firing angle for both the positive and negative half cycles of the AC waveform to be identical and balanced. However, certain methodologies may cause the positive and negative firing angles to differ from each other and to vary from each other, but which still give an average equal firing in both polarities.

Referring to FIG. 5, in a first half cycle, which in this example is upon detection of a negative-to positive zero cross transition of the AC waveform (510) and hence in the positive AC half cycle, and after a delay has elapsed (515) to wait for the known, given control algorithm in the microcontroller 430 to fire the triac 420 in the half cycle, the voltage across the triac 420 is checked (520) for re-firing using the positive VAC ½ cycle voltage monitor 427. If monitor 427 detects a voltage across the triac 420 (output of 530 is 'YES'), this generates a logic high signal in microcontroller 430 which represents that triac 420 is OFF, and microcontroller 430 will attempt to re-fire the triac 420 (at 540) by sending a gate firing signal over line 418 to maintain conduction. If the output of 530 is 'NO', this indicates that the triac 420 is ON and conducting (at 545), generating a logic low in microcontroller 430.

Either after re-firing the triac 420 or if it is determined that the triac 420 is ON and conducting, the same check at 520 is repeated, i.e., monitor 427 repeats sampling voltage across the triac 420 at fixed regular intervals if the minimum conduction point has not been reached (output of 550 is 'NO'). In an example, monitor 427 can repeat sampling voltage across the triac every 9 degrees after the triac 420 has fired up until the minimum conduction point is passed.

As discussed above, if the minimum conduction point has been reached (output of 550 is 'YES'), no change is made to the state of triac 420, the triac 420 remains in its current ON or OFF state (555) until the next zero-cross transition is detected by microprocessor 432. Similarly, if the triac 420 is still OFF after the minimum conduction point has been reached an/or exceeded, it remains off in the remaining half-cycle until the next zero-cross transition to the opposite half cycle has been detected. Accordingly, the above implementation may provide a simple logic input to the digital system (microcontroller 430) that can easily and quickly determine the 'on'/'off' condition of the triac 420 during the positive AC half-cycle without consuming the ADC 433 resource which can be used to measure triac 420 current.

During the negative half-cycle, the triac gate voltage will be negative if the triac 420 is ON and as a result for the ADC 433 in the microcontroller 430, the analog voltage is level shifted such that 0V (at the gate) becomes about 1.8V. This is so the ADC 433 can measure the negative gate voltages. Therefore, triac 420 ON gives a lower analog voltage than a threshold, and triac OFF corresponds to a higher analog voltage than the threshold, which in an example could be about 1.0V.

Accordingly, once the second or next zero-cross transition has been detected by the microcontroller 430 (at 560 in FIG. 5), which in this example is upon detection of a positive-to-negative zero cross transition of the AC waveform and upon elapsing of the set delay at 562, triac 420 conduction detection is evaluated in the negative AC half cycle. In general, the triac gate voltage is sampled by gate voltage monitor 425 (at 565) and compared to some threshold at 570 (such as a nominal analog voltage value) to determine whether the triac 420 is ON or OFF. In an example, the triac 420 is OFF and will be re-fired by the microcontroller 430 (at 575) if the measured voltage is higher than this threshold (e.g., nominal analog voltage value, output of 570 is 'YES')), else it is determined to be ON and conducting (at 580), since a triac 420 ON in the negative half cycle gives a lower analog voltage than the threshold value.

As described above, the microcontroller 430 will continue to attempt to ensure, by checking at regular intervals, that the triac 420 is maintained in the on-state (output of 585 is 'NO') from the moment it is fired until the minimum conduction point is reached (output of 585 is 'YES'), after which the firing of the triac 420 is no longer critical for the reminder of the half-cycle. The triac 420 remains in its current state (at 590) and the process at 510 repeats upon the following zero-cross detection.

Accordingly, triac 420 'on'/'off' determination can be done in both half cycles of the triac voltage using a gate voltage monitor 425 and/or a positive VAC ½ cycle voltage monitor 427. Once the triac 'on'/'off' state is determined, either based on logic or based on the voltage value of the triac 420 (depending on the half-cycle being monitored) the triac 420 is either re-fired as necessary for the remainder of the AC half-cycle in an attempt to re-establish conduction of the triac 420, or is maintained ON for the duration of the half-cycle via subsequent checks. Re-firing is typically limited to a given number of attempts and ceases once the minimum conduction point in any given 180 degree half-cycle is reached (a point where very little voltage is applied to the motor 15 to cause any noticeable torque or rotation, such as a 30 degree conduction angle, for example).

Another function of the algorithm is to ensure that the triac 420 is re-fired once conduction from the previous AC half-cycle has ceased. This extended conduction interval is typical for motor loads where the current can significantly lag the voltage, and as a result the current from an example negative AC half-cycle will continue into the positive AC half-cycle before the triac 420 actually commutates 'off'.

Therefore, triac 420 firing should not commence until the triac 420 has turned OFF from the previous AC half-cycle. This turning off point can be determined either by monitoring triac current, triac gate voltage from monitor 425 and/or triac voltage from monitor 427 to establish when the triac 420 has actually turned 'off'.

Zero Cross Detection

In one example, the control circuit 400 of control module 100 may be configured to implement a zero cross detection methodology to establish reliable phase angle control for triac 420 (also referred to as firing angle control or conduction angle control) for the triac 420. Zero cross detection enables synchronization between the AC supply (which is an input AC voltage signal from AC mains 407 to the tool 10 and control module 100) and the control module 100, so as to provide a desired level of noise immunity for situations where the normal AC supply is disturbed by one or both of the AC tool control itself and external influences on the AC supply signal input from AC mains 407. Thus, accurate zero-cross detection enables more precise timing for desired firing angle control for triac 420, while providing a noise immune way to establish zero crossing points on AC supply waveforms which have noise (e.g., standalone AC generators).

Figure 6A:
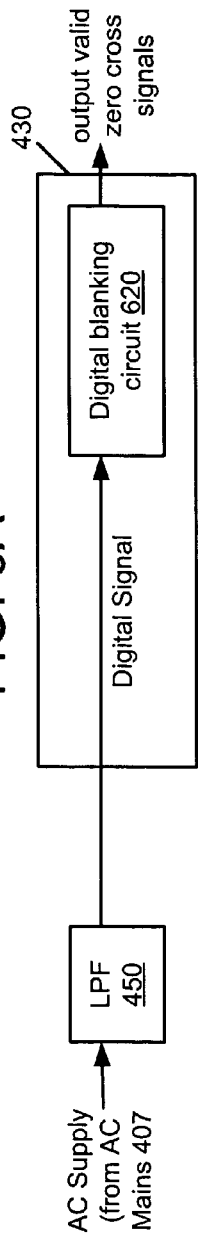
FIG. 6A is a block diagram to illustrate a zero-cross detection circuit portion of the control circuit 400 for implementing zero cross detection.
Figure 6B:
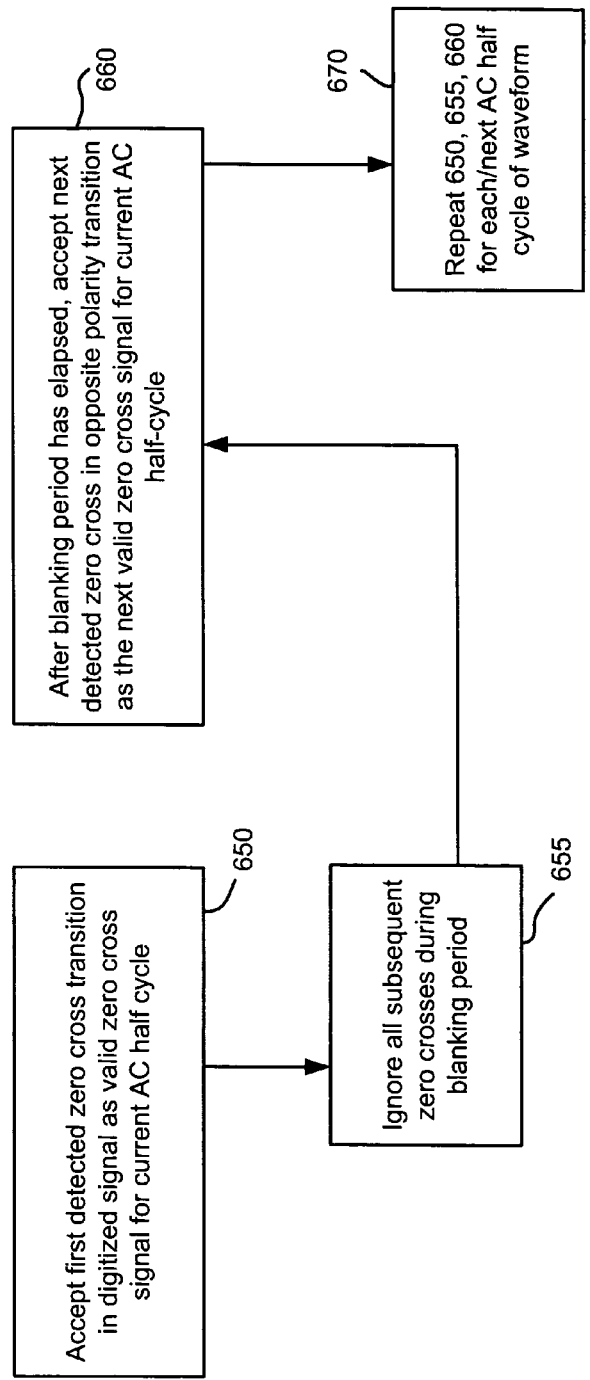
FIG. 6B is a flow chart describing a method of detecting zero crossings of the AC supply signal to synchronize the control module 100 with the tool motor.

FIG. 6A is a block diagram to illustrate a zero-cross detection circuit portion of the control circuit 400 for implementing zero cross detection; FIG. 6B is a flow chart describing a method of detecting zero crossings of the AC supply to tool 10. As shown in FIG. 6A, a low-pass filter 450 (see FIG. 4) optionally can be combined with a digital blanking circuit 620 within controller 430 to implement zero cross detection. In an example, the digital blanking circuit 620 may be a software-based algorithm stored in EEPROM 436 and implemented by microprocessor 432.

However, the digital blanking circuit 620 can detect zero crosses without a filtered input of the AC supply via RC filter 450. In this example, the AC supply is digitized in controller 430 by a normal digital input (not shown) to generate a digital signal. As it is well known for microcontrollers to have digital inputs, a detailed illustration is omitted. The digital signal is then processed in a software-based digital blanking circuit 620 within microcontroller 430. Functionality of the digital blanking circuit 620 is invoked under control of the microprocessor 432 to eliminate unwanted noisy zero crosses, as to be described in more detail below with regard to FIG. 6B.

The low pass-filter 450 is merely one example of a filter usable to filter the AC supply signal. Alternatively, a band-pass filter (BPF) or phase-locked loop (PLL) may be used to filter a part of the AC supply signal from AC mains 407. In an example, the LPF may filter the analog AC voltage signal to remove frequencies in excess of 80 Hz which typically represents the frequency of the noise that occurs around the zero-cross of the AC supply signal.

Referring to FIGS. 6A and 6B, which shows an example where optional filtering is employed, a part of the AC supply signal from AC mains 407 is filtered by LPF 450 to generate a filtered analog output signal. The analog output signal is digitized in controller 430 by a digital input of the controller 430 to generate a digital signal. This digital signal is then input into the software-based digital blanking circuit 620, the functions of which are iterated by the microprocessor 432 to eliminate unwanted noisy zero crosses. As previously described, the digital blanking circuit 620 is a software-based algorithm stored in memory accessible by the microprocessor 432 from EEPROM 436.

Referring now to FIG. 6B, to implement zero cross detection, the digital blanking functionality, under control of microprocessor 432, accepts the first zero cross transition, as represented in the digital signal, as a validly detected zero cross signal for a given (or current) AC half cycle (650), and then ignores or rejects remaining zero crosses (655) in the digital signal for a specified blanking period. For example, this blanking period can be variable based on the frequency of the AC supply. All zero crosses are rejected until this blanking period has elapsed. The zero cross occurring at the next opposite polarity transition after the blanking period elapses (i.e., for a 50 Hz supply, after a blanking period of 10 milliseconds has elapsed) is then accepted (660) as the next valid zero cross in that half cycle of the AC supply voltage waveform.

This process is repeated (670) for each given AC half-cycle such that only the first AC zero cross is used for each AC half-cycle. This blanking period (i.e., 10 milliseconds for the 50 Hz example above) may be reduced to allow the control module 100 to operate over a range of AC supply voltage frequencies (e.g. 40 Hz to 70 Hz) and as a result, the half-cycle blanking period may be reduced to about 6-8 msec. An example blanking period for a given half cycle of the AC supply may be about 6.125 msec., for example.

Using digital blanking, with or without filtering, may enable zero-cross detection in a low cost system, while providing a robust zero-cross signal which is immune to AC voltage supplies where noise is very common, such as portable generators. The additional use of a low-pass filter may eliminate the majority of the high-frequency noise that occurs around the zero-cross of the AC supply signal. Use of a software-based digital blanking unit may eliminate other 'false' zero crosses which may occur throughout the AC supply half-cycles caused by unusual sources such as portable generators.

Current Measurement Offset Correction

In an AC powered tool such as tool 10, accurate current measurement is required for control purposes in control module 100. Accordingly, voltage offsets in current measuring circuitry should be accounted for (i.e., the current measurement should be calibrated) to ensure an accurate current measurement. In FIG. 4, the current measurement circuitry includes the shunt 440 to convert the actual measured current to an analog low voltage value representative of the current for measurement purposes. Shunt 440 may be a low resistance value (e.g. 5 milliohms) and as a result the representative voltage (e.g. 5 millivolts per ampere) from the shunt 440 may need to be amplified to allow a digital controller such as the microcontroller 430 to resolve and measure the current. This amplification is provided by amplifier 445.

In tool 10, currents up to a peak value of at least 50A are to be measured; however this may only provide a small, low voltage signal across the shunt 440. In an example, this voltage signal representative of measured current may be about 0.25V. Typical digital systems such as microcontroller 430 have a 2.5V analog-to-digital converter (ADC), such as ADC 433, which will resolve the voltage signal input from shunt 440 to about 2.5 millivolts (i.e. 10-bit resolution). Therefore, to maximize the resolution of the ADC 433, a gain of 10 may be introduced using amplifier 445 between the shunt 440 and the ADC 433.

Amplifier 445 may be an operational amplifier (op-amp) such as a single-supply rail-to-rail amplifier, for example.

Amplifier 445, like all amplifiers, may be biased, e.g., may have an offset voltage or bias voltage applied at its input. In an example, resistor components may be used to adjust the actual shunt voltage seen at the amplifier 445 input, so that the output is biased. This offset voltage can be significant as compared to the 0.25V input signal from shunt 440.

Accordingly, to compensate for this offset voltage, amplifier 445 can be biased in such a way that the op-amp offset, whether positive or negative, still permits a true zero current value to be measured by the ADC 433 from the amplifier 445 output under all offset conditions of the amplifier 445. For example, the input of the amplifier 445 may be biased in such a way that with a zero current input, the output of the amplifier 445 is set to be above 0V or 'ground' regardless of the amplifier offset.

As a result of the amplifier 445 biasing, it may be necessary to measure the ADC value when a true zero current condition exists so as to determine a compensative value, also referred to as a zero-current offset, to be applied to actual current measurements. The compensation value or zero-current offset is an ADC value that is measured in a situation where there is no current—the triac 420 is not fired. For example, this is done in a functional test procedure during manufacture of the control module 100.

In this testing situation, zero current is known to exist and the ADC value output of ADC 433 can be measured and recorded in EEPROM 436 as a compensation value representative of the voltage offset in amplifier 445. In general, the compensation value (i.e., an 'offset ADC value' or zero-current offset) is subtracted in the microcontroller from an actual current ADC value to obtain the true current measurement for a particular sample (as scaled by the amplifier 445 and shunt 440). More specifically, to determine a true current measurement, such as an average current value across triac 420 in a given half cycle, once the microcontroller 430 senses a positive going zero cross of the AC waveform, ADC samples from the shunt 440/op-amp 445 are taken repetitively throughout the positive voltage half-cycle, and summed together in the microcontroller 430. For each sequential ADC value that is output from ADC 433, the microcontroller 430 subtracts the compensation value (zero-current offset) to obtain the true current measurement for that ADC value. At the end of the positive AC half-cycle (i.e., the microcontroller 430 senses a negative going zero-cross of the AC waveform, the summed value is averaged (divided by the number of samples), and at this point the result is proportional to the average AC current flowing during the AC half-cycle. In this way, any amplifier offsets from amplifier 445 are removed from the true current ADC measurement, regardless of the actual amplifier 445 offset bias.

A potential benefit of amplifier biasing is that negative currents can be measured. The ADC 433 is often integrated into the microcontroller 430. It uses the same Vcc (typically +5Vdc, but possibly +3.0Vdc or any other voltage) as the microprocessor 432 in the microcontroller 430. Therefore, only voltages between Vss (ground potential or 0.0 Volts) and Vcc can be measured by the ADC 433.

Typically the voltage across the shunt 440 is amplified such that the maximum instantaneous current becomes Vcc (and Vcc is the analog reference for the ADC 433). This is accomplished by adjusting the amplification factor of the amplifier 445. Typically, a voltage of Vcc is converted by the ADC 433 into the full-scale digital value. For a 10-bit ADC, full-scale is a numerical value of 1023 counts, and the 0.0 Volt conversion value is a numerical value of zero counts.

In a first example, a peak current of 64 Amperes denotes a full-scale ADC output and zero amperes denotes a zero ADC output, or zero counts. Then, by adding electrical bias to the amplifier circuit while maintaining the same amplification factor, it becomes possible to shift the amplified value of zero current to Vcc/2, resulting in 511 or 512 ADC counts.

Similarly, an instantaneous current of 32 Amperes becomes 1023 counts, and an instantaneous current of −32 Amperes becomes zero counts. A value of 64 Amperes is now off scale and will be clipped to a numerical value of 1023, in this second example. The electrical bias applied to the amplifier need not be so large as to make the zero current equal Vcc/2.

In a third example, let the electrical bias be applied to the amplifier 445 such that zero Amperes results in 96 ADC counts while the gain of the amplifier 445 remains unchanged. Thus small negative AC currents may be measured, i.e., down to an ADC value of 0 counts. In this example, where the amplifier biasing shifts the output of amplifier 445 such that 96 ADC counts equals 0 amps, assuming 1 amp per 16 counts, then zero ADC counts would represent −6 Amperes, 16 ADC counts would represent −5 Amperes, 32 ADC counts would represent −4 Amperes, 48 ADC counts would represent −3 Amperes, 64 ADC counts would represent −2 Amperes, 80 ADC counts would represent −1 Amperes, and 96 ADC counts would represent 0 Amperes. The full-scale current is no longer 64 Amperes but 58 Amperes. This provides a useful way to correct the AC current measurement and make allowance for small negative currents or large negative currents, as the application requires.

In module 100, the positive half-cycle current may be measured for the positive AC voltage half-cycle. Since the AC current typically lags the voltage by a small amount, some of the current flowing during the positive AC voltage half-cycle is negative. The amplifier 445 biasing as described above therefore allows these small negative currents to be measured at the start of the positive voltage AC half-cycle. If the negative currents are inverted and considered positive in the microcontroller 430, the complete AC half-cycle of current can actually be measured. This is discussed in more detail hereafter.

Current Calibration

Proper current calibration is also necessary for accurate firing angle control of triac 420. Current calibration is necessary from a practical standpoint to allow for shunts, amplifiers, analog references, and ADCs which have a wide range of operational characteristics. The accuracy of current measurement may be dictated by the accuracy of the shunt 440, the amplifier gain and amplifier bias or offset at op-amp 445, the ADC 433 accuracy and a voltage reference for the ADC 433 (not shown).

Current calibration may be performed during a testing phase (such as during control module 100 manufacture) to determine an ADC compensation value used to scale all current measurements. In this case, the triac 420 conducts a known and accurate current that is sensed by shunt 440, amplified at op-amp 445 and input into ADC 433 to determine an ADC compensation value.

This ADC compensation value is used to compute a Current Calibration Factor (CCF) during the testing phase. For example, the CCF is equal to 128 times the expected value divided by the difference of the measured value less the zero-current value. Thus, for a zero-current value of 0, an expected value of 320, and a measured value of 320, the CCF is 128.

This CCF is recorded in microcontroller 430 non-volatile memory and used in real-time calculations by the microcontroller 430 to compute the actual current value from the measured current value. For example, this CCF value is stored in EEPROM 436 and used by the operational software within the microcontroller 430 of the control module 100 to scale all current measurements, such that all inaccuracies of the control module 100 are calibrated out.

In an example, the CCF can be computed in such a way that values of Shunt 440 resistance, Amplifier 445 gain, and ADC reference voltage 433 give a perfect Current Calibration Factor value of 128. If the resistance of the shunt 440 is lower than nominal, then the CCF will be greater than 128. If the resistance of the shunt 440 is higher than nominal, then the CCF will be lower than 128. Similarly, if the Amplifier gain of amplifier 145 is lower than nominal, then the CCF will be greater than 128, and less than 128 if higher than nominal.

If the ADC reference voltage is lower than nominal, then the value returned by the ADC 433 is greater than nominal and the CCF will be lower than 128. If the ADC reference voltage is greater than nominal, then the value returned by the ADC 433 is lower than nominal and the CCF will be greater than 128. Thus, to perform a correction on a measured current value, the measured current value is multiplied by the CCF and divided by 128.

Accordingly, a CCF of 128 becomes multiplication by a factor of 1. If the shunt resistance is one-half of nominal, then the CCF would be 256. Suppose further that during normal operation the instantaneous current flowing through the triac 420 is precisely that current that should give a value of 128. Then, multiplying this measured current value of 64 by 256, the CCF, and dividing it by 128 would restore the measurement of 64 to a value of 128, the proper value. It is understood that before applying the CCF, any current offset must be removed from the current measurement.

Tachometric Hysteresis for Speed Measurement and Control

In another example, control module 100 may utilize hysteresis for motor speed measurement and control. In a basic tachometric speed control system, speed is determined using a magnet on the motor and a pick-up coil (inductor) placed nearby. For example, the pick-up coil assembly 250 is configured to detect motor speed of tool motor 15. As shown in FIG. 2, in the tool motor 15 (which is comprised of a tool motor armature 20 rotating within a tool motor field 30), as the armature 20 rotates, the magnetic field from the magnets on armature 20 is picked up by the pick-up coil assembly 250 to give an accurate reading of motor speed. Thus, as the motor 15 rotates, the voltage across the coil of the pick-up coil assembly 250 sinusoidally increases and decreases. The faster the motor armature 20 spins, the higher the frequency of the sinusoid.

Figure 7:
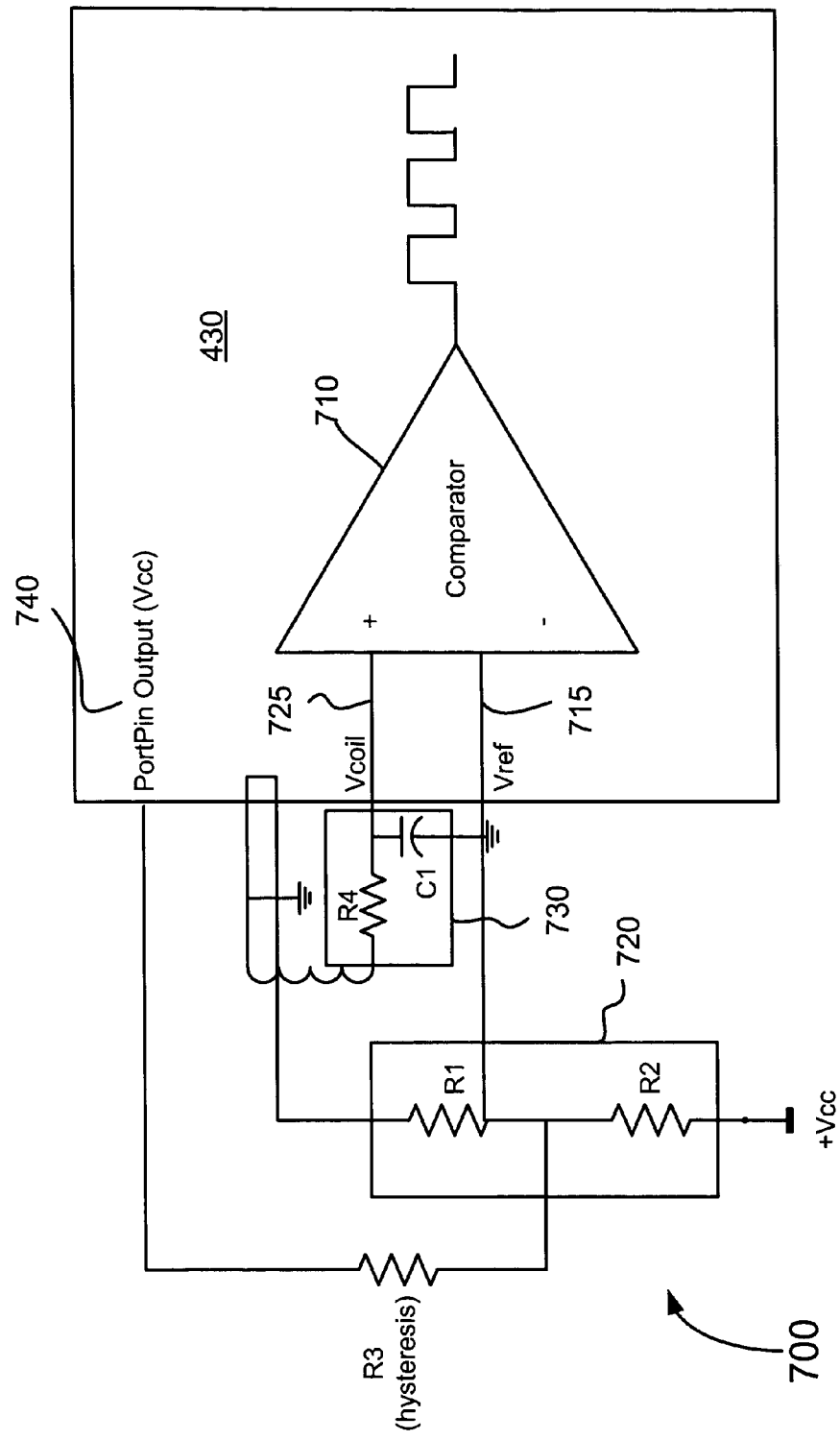
FIG. 7 illustrates an example circuit used in motor control module 100 to determine motor speed.

FIG. 7 illustrates an example circuit used in motor control module 100 to determine motor speed. FIG. 7 is provided to illustrate a way to measure the motor speed using a pickup inductor and a comparator so as to output a set of pulses within the microcontroller 430. The frequency of the pulses is directly proportional to the speed of the motor 15. Once actual speed is measured, the microcontroller 430 can perform a control algorithm to control the measured speed to a desired value as determined by various control inputs.

Microcontrollers such as microcontroller 430 in FIG. 4 may contain one or more comparators which can trigger a response if the comparator output goes above or below a reference voltage. As shown in FIG. 7, circuit 700 includes a comparator 710, a voltage divider circuit 720, an RC filter 730 and a hysteresis resistor (shown as R3). The voltage divider circuit 720 (resistors R1 and R2) creates a fixed voltage reference (Vref) as one input 715 to the comparator 710. The second input (tachometric input 725) is the voltage signal (Vcoil) from the pick-up coil assembly 250. The second input 725 is filtered by the RC filter 730 to reduce the amount of noise going into the comparator 710. As Vcoil increases to exceed Vref, the microprocessor 432 in controller 430 sees a low output at the comparator 710. As the motor voltage (Vcoil) drops below Vref, the microprocessor 432 sees a high output on the comparator 710.

The controller 430 measures the time period between these high-to-low-to-high transitions, motor speed can be determined. Without hysteresis, the reference voltage Vref is fixed and will not change. If the measured voltage signal Vcoil is hovering around the Vref and noise is induced in the system, the microprocessor 432 would see multiple high/low transitions resulting in inaccurate speed measurements by the controller 430.

To prevent this from occurring, the microcontroller 430 employs comparator hysteresis using a hysteresis resistor to provide speed measurements from the pick-up coil. In FIG. 7, circuit 700 includes a third hysteresis resistor (R3) controlled via software through a port pin 740 on the microcontroller 430. If the port pin 740 is configured as an output and connected to ground, the resistor R3 affects the voltage divider created by R1 and R2 by reducing Vref.

However, once a low-to-high transition occurs, the port pin 740 is re-configured as an output and connected to Vcc. This changes the voltage divider circuit 720 so that it includes the parallel combination of R1 and R3, thus increasing the value of Vref (as the value of Vref is determined by the values of R1, R2, R3). Now Vcoil must increase to a higher value before the comparator 710 will switch output again.

Accordingly the controller 430 employs comparator hysteresis, using the hysteresis resistor R3, in providing speed measurements from the pick-up coil in close proximity to a rotating magnet of the tool motor 15. The changing/switching of the voltage reference level Vref using hysteresis makes it less likely for any noise on the second tachometric input 725 of the comparator 710 to exceed the switched reference level (as the switching of the port pin 740 moves the reference away from the switching point of the comparator 710) and minimizes false comparator 710 output events. This combination may provide software level control of the comparator 710 output, potentially providing more reliable speed measurements as noise on the tachometric input (second input 725) is compensated for using the hysteresis resistor R3 to adjust Vref.

Average Current Estimation

The control module 100 estimates average current flowing through the triac 420 using an estimation algorithm in an effort to control the conduction angle of triac 420 in response to changing load of the tool motor. Accurate estimation of the current flowing through the triac 420 is conducive to accurate control. There are multiple ways to characterize time-varying current that has a mean value of zero amperes, such as through calculations of Root-Mean-Square (RMS) current and average current.

Average current could also be computed for negative excursions, i.e., in the negative AC half-cycle, but this value must be the same as average current during positive excursions over the fundamental frequency period of time. Accordingly, in an example below current flowing during the positive half-cycle will be used to estimate average current.

Typically, RMS current computations are prohibitive in a microcontroller while average current computations are not. Accordingly, the examples proved below are described with respect to average current computations, it being understood that accurate estimation of the current flowing through the triac 420 for accurate control could be achieved using RMS calculations.

The control module 100 detects zero crossings by monitoring the AC supply voltage that powers the power tool 10 and the module 100. The zero-crossings may be used to establish the AC power frequency so that the microcontroller 430 may apply corrections to its outputs to compensate for deviations from the nominal frequency. Furthermore, the positive-going zero crossing of AC supply voltage marks the beginning of the positive half-cycle, and the negative-going zero crossing of AC supply voltage marks the end of the positive half-cycle.

Figure 8:
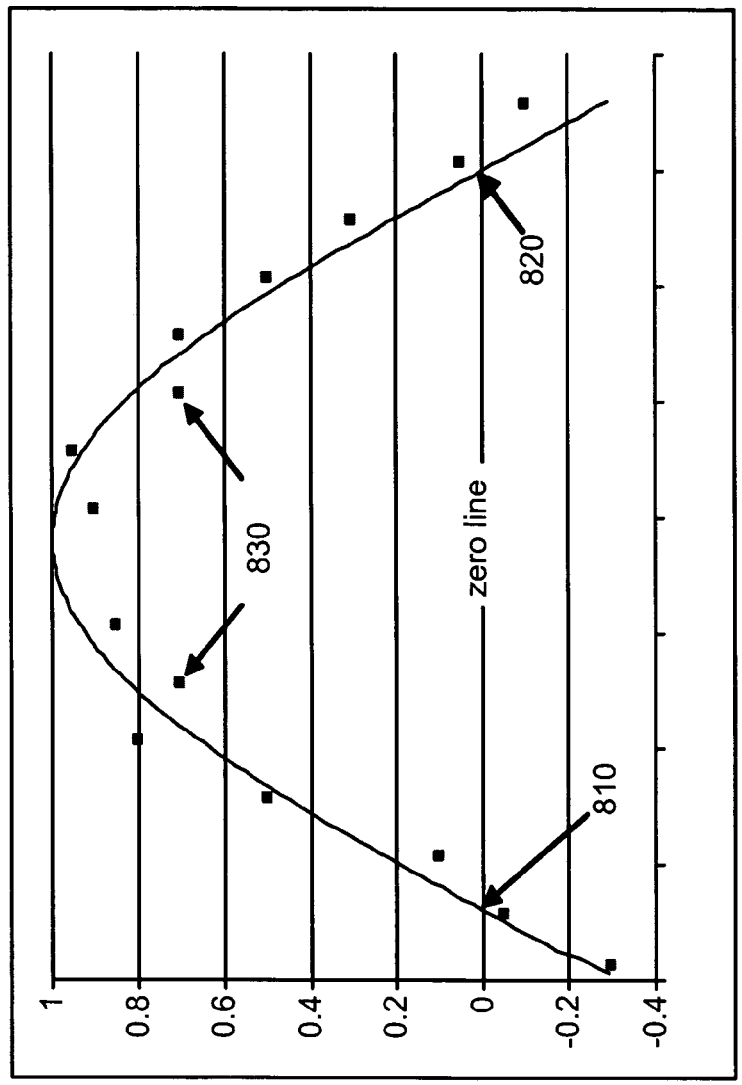
FIG. 8 illustrates an example positive half cycle of an AC voltage waveform and corresponding sampled motor current data points.

FIG. 8 illustrates an example positive half cycle of an AC voltage waveform. Referring to FIG. 8, the period of time between the positive-going zero-crossing (at 810) and the negative-going zero-crossing (at 820) defines the positive AC half-cycle. During the positive half-cycle of voltage, the current through the shunt 440 is measured and accumulated; these are show as samples 830. Typically at the conclusion of the positive half-cycle, this accumulation is divided by the number of samples, providing the average current flowing through the triac 420 during the positive half-cycle of the AC voltage waveform.

As discussed previously, biasing of the op-amp 445 to shift the ADC counts allows negative current to be measured by the ADC 433, down to the limit of the biasing. Applying a bias voltage to the op-amp 445 effectively shifts the range of current values that may be measured, such that a handful of negative current values may be measured in the vicinity of the negative-to-positive transition of the positive AC half cycle.

Because the tool motor 15 presents a partially inductive load, the AC current will not be completely in-phase with the AC voltage, but will be slightly out-of-phase. The phase angle between voltage and current will be neither zero degrees (purely resistive) nor 90 degrees (purely inductive), but somewhere in between. Thus, the current will have both an in-phase component, and an out-of-phase component, with respect to the voltage.

With some inductance, the current will not be zero when the voltage waveform crosses zero in either direction. Thus any current measurements just after a positive-going voltage zero-crossing, or just prior to a negative-going voltage zero-crossing, could be negative or positive respectively.

Figure 9:
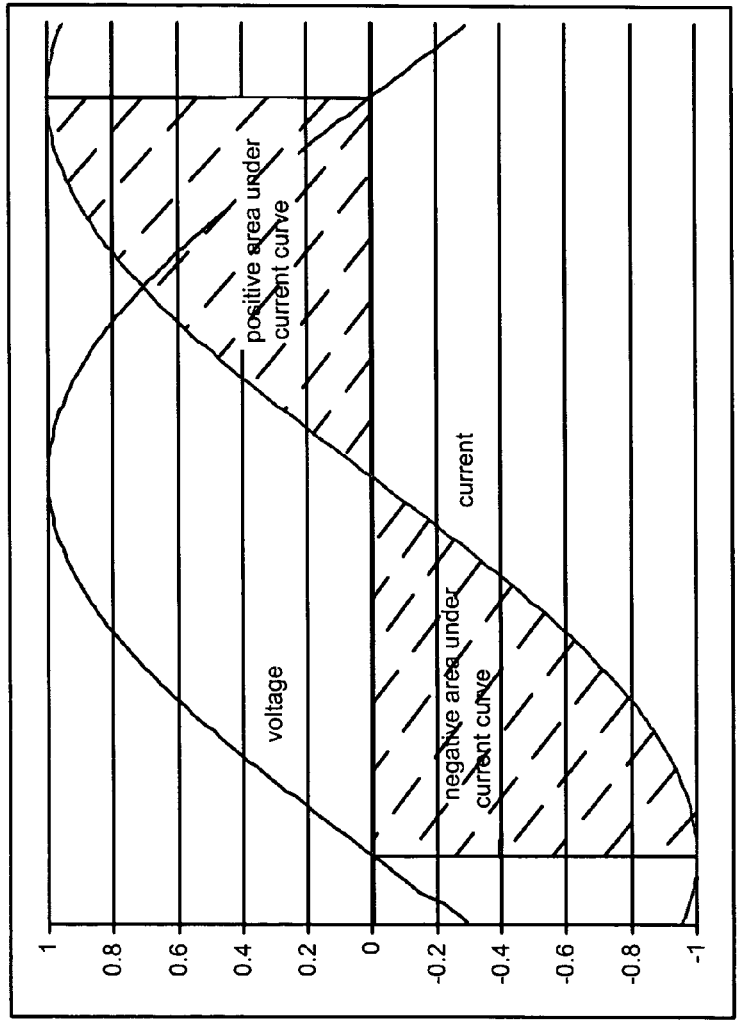
FIG. 9 illustrates a positive AC voltage half-cycle and the associated half-cycle of current in the AC waveform for a purely inductive load.

FIG. 9 illustrates an AC voltage and current waveform for a purely inductive load. A conventional current averaging estimation algorithm takes the sum of all individual current measurements and then divides by the number of measurements (number of samples) at the end of the positive half-cycle (when the voltage waveform crosses zero in the negative-going direction). If certain measured individual current samples are negative, these negative values effectively subtract from the summation of current over the positive voltage half-cycle; this skews the calculation for estimated average current downward from its true value, because the average current value is assumed only for the positive AC half-cycle of current.

For example, and referring to FIG. 9, if the load (tool motor 15) was purely inductive, the average current over the positive voltage half-cycle would be exactly zero. In FIG. 9, the negative area under the current curve, from 0 to 90 degrees, exactly equals the positive area under the current curve, from 90 to 180 degrees. Thus the average current is precisely zero over this interval. However, the true current is clearly not zero, but rather some non-zero value.

Figure 10:
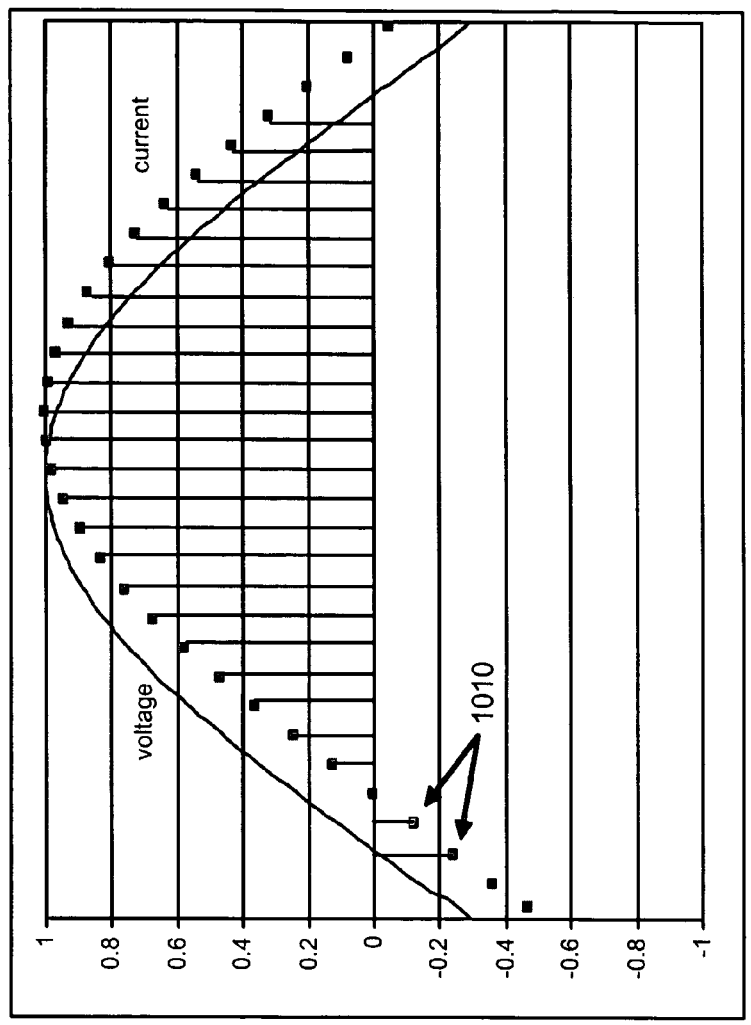
FIG. 10 illustrates voltage and sampled current waveforms in the positive AC half cycle for a slightly inductive load to describe a method of estimating average current in accordance with an example embodiment.

FIG. 10 illustrates voltage and current waveforms in the positive AC half cycle for a slightly inductive load to describe a method of estimating average current in accordance with an example embodiment. As shown in FIG. 10, an improved algorithm to estimate true average current (for positive half-cycles) may disregard the individual negative current measurements; these samples would not be added or accumulated to the sum of current measurements in the positive half-cycle. The total sum of current measurements would thus equal the summation of non-negative current measurements between the two zero-cross transitions. As shown in FIG. 10, the two measurements indicated at 1010 would be ignored.

Accordingly, ADC values determined by ADC 433 from the non-negative samples measured by shunt 440 would be accumulated, then divided by the total number of all measurements in the half-cycle between the two zero cross transition points in order to determine the estimated Average current. The resulting estimated Average current value would be closer to the true average current. Another estimate of the Average current would accumulate ADC values determined by ADC 433 from the non-negative samples measured by shunt 440 and then divide by the total number of non-negative measurements in the half-cycle between the two zero cross transition points. Accordingly, in the example of FIG. 10, ignoring negative current measurements may improve the estimation of Average current flowing through the triac 420.

Figure 11:
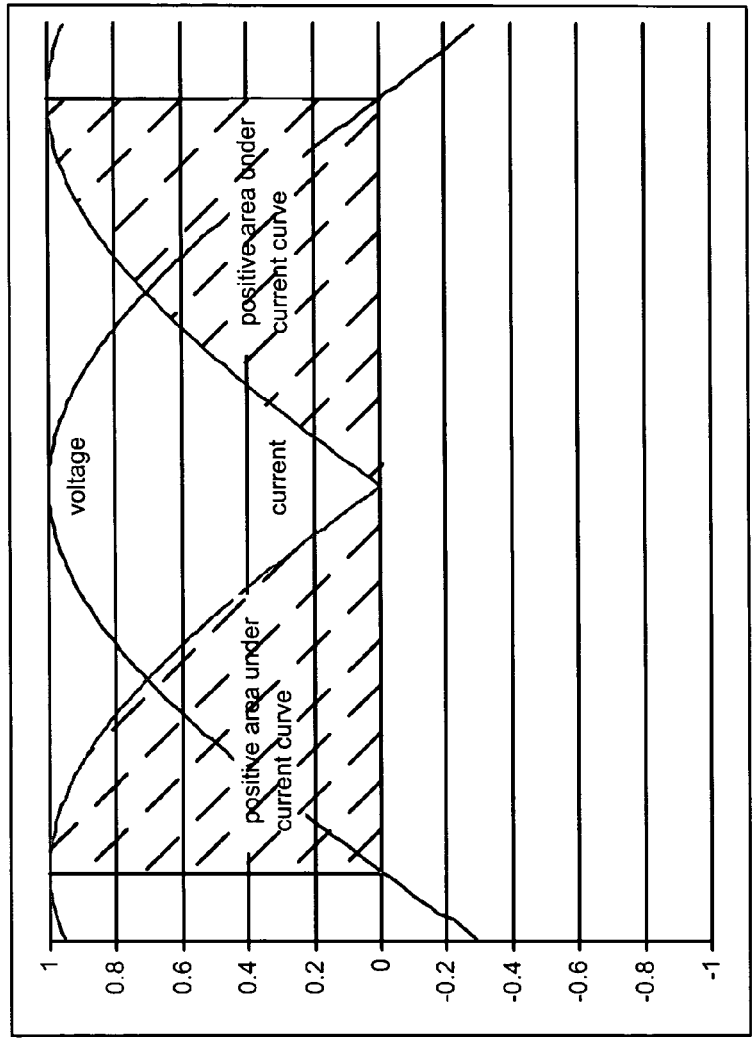
FIG. 11 illustrates voltage and the absolute value of the sampled current waveforms in the positive AC half cycle for a pure inductive load to describe a method of estimating average current in accordance with another example embodiment.

FIG. 11 illustrates voltage and current waveforms in the positive AC half cycle for a pure inductive load to describe a method of estimating average current in accordance with another example embodiment. Instead of ignoring the negative current measurements, if the individual negative current measurements are actually subtracted from the summation of current measurements, rather that being added, then the summation of current measurements will produce a more robust estimation of the average current. This is because subtracting negative measurements is equivalent to taking the absolute value of all current measurements before summation.

Accordingly, as shown in FIG. 11, the average current over the positive voltage half-cycle is equal to the average current over the positive current half-cycle. The estimation of average current flowing through the triac 420 may be even more robust if the current waveform is symmetrical about the 90 degree phase point, as shown in FIG. 11. Further, by biasing the op-amp 445 for the shunt 440 measurements so that zero current (as determined by microcontroller 430 reading the ADC values) is the mid-point of the measuring range, accurate current measurements may be made over the entire 360 degrees of the AC cycle.

For example, the op amp 445 may be biased at its input so that its output to ADC 433 allows a full range of positive and negative current measurements to be measured by microcontroller 430 at the output of ADC 433. This would bias the zero-current shunt signal to the mid-point of an example measuring range, such that a range encompassing a number of negative and positive current measurements could be measured. An example range may be between +/−32 Amperes of current. This allows current to be computed over a complete AC cycle.

Figure 12A:
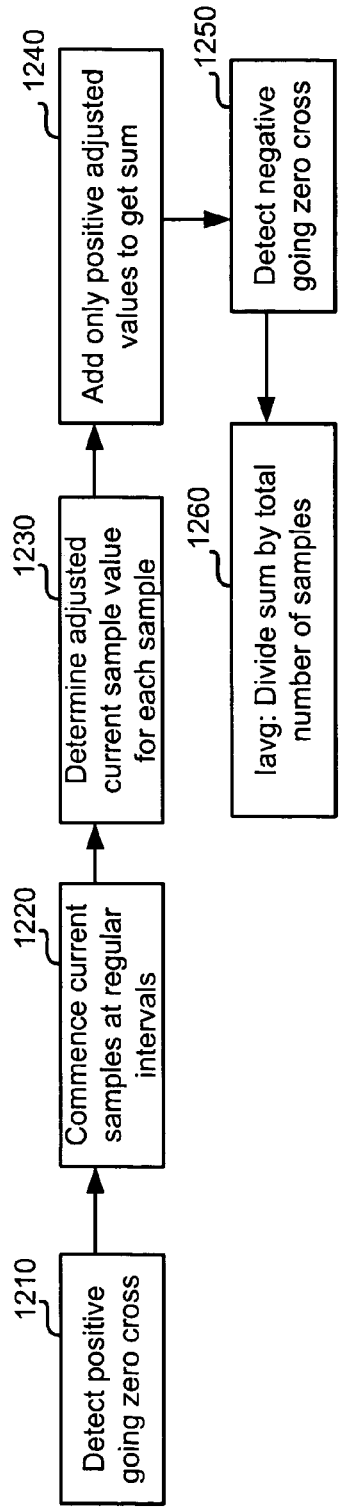
FIG. 12A is a flowchart for illustrating a method for estimating average current through the triac of the motor control module in accordance with an example embodiment.
Figure 12B:
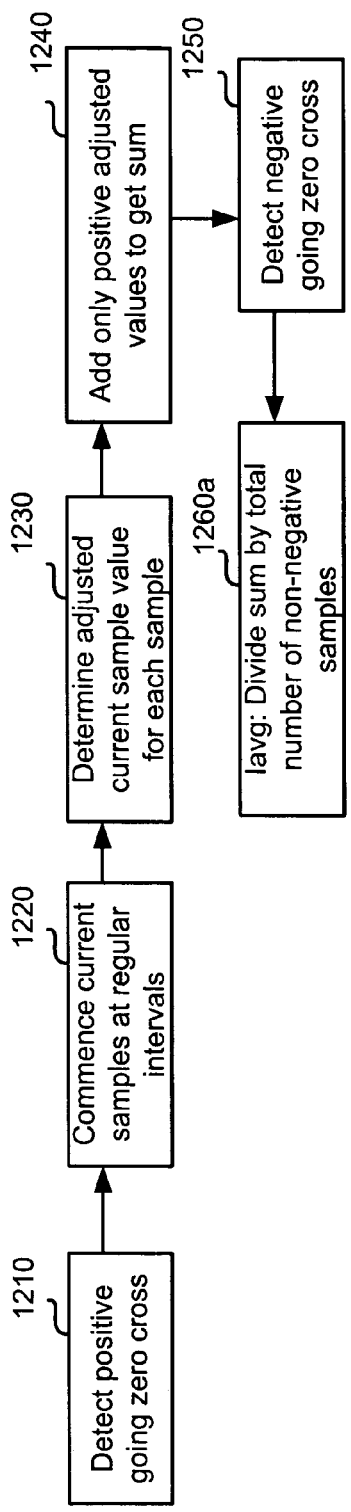
FIG. 12B is a flowchart for illustrating a method for estimating average current through the triac of the motor control module in accordance with another example embodiment.
Figure 12C:
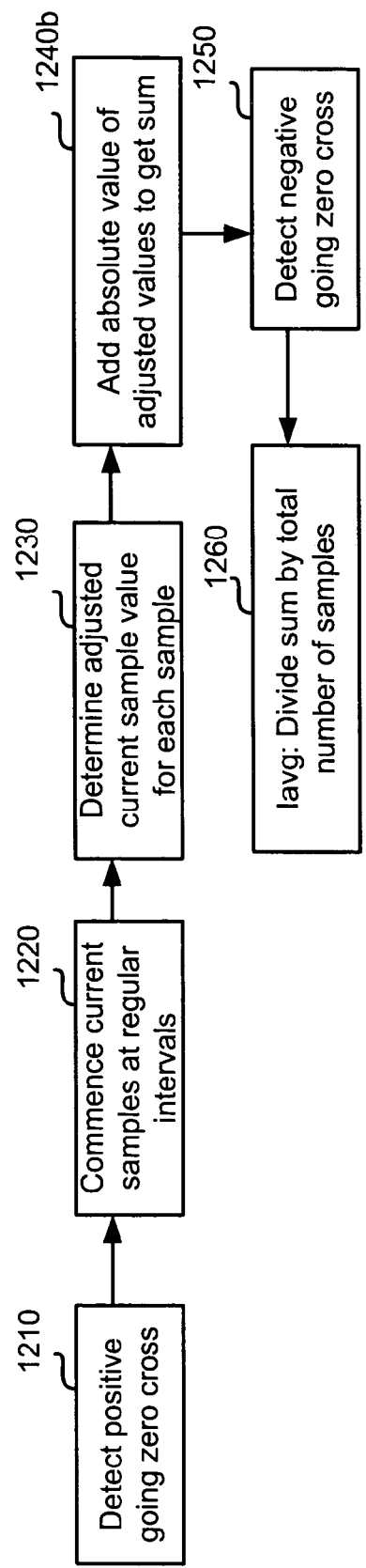
FIG. 12C is a flowchart for illustrating a method for estimating average current through the triac of the motor control module in accordance with another example embodiment.

FIG. 12A is a flowchart for illustrating a method for estimating average current through the triac of the motor control module in accordance with an example embodiment; FIG. 12C is a flowchart for illustrating a method for estimating average current through the triac 420 in accordance with another example embodiment. FIGS. 12A and 12B correspond to the graph of FIG. 10, and FIG. 12C corresponds to the graph of FIG. 11.

Referring to FIG. 12A, the microcontroller 430 senses a positive-going zero-crossing of the AC voltage waveform (1210), which is a trigger for the microcontroller 430 to begin sampling the current via the shunt 440/op-amp 445 at regular intervals (1220). For each ADC value representing a given current sample that is received from the ADC 433, the microcontroller 430 will determine an adjusted value (1230). This is done by subtracting a zero-current offset from the ADC value to get the adjusted current sample value. This zero-current offset has also been referred to as a compensation value above, and has been previously determined in testing/calibration during control module 100 manufacture. The zero-current offset is stored in non-volatile memory such as ROM or EEPROM 436.

As described in FIG. 10, the microcontroller 430 next adds only those adjusted values that are positive (1240) to determine a sum. Negative current samples are ignored. Once the microcontroller detects the negative-going zero-crossing of AC voltage waveform (1250), the sum is divided (1260) by the number of samples to determine the estimated Average current. FIG. 12B is the same as FIG. 12A, with the exception that the estimated Average current is determined by dividing the sum by the number of non-negative samples (1260a), instead of all samples.

FIG. 12C includes the same steps as FIG. 12A to estimate average current with the exception of step 1240b. This illustrates the alternative method using absolute values of all current samples in the sum operation. The microcontroller 430 thus adds the absolute values of all the current samples in the positive AC half cycle (1240) in determining the sum. The negative current samples within the positive AC half cycle are therefore included in the Average current calculation, but are additive to the sum as the absolute value is used.

Oscillator Calibration in the Microcontroller

Many microprocessors and microcontrollers use an internal oscillator as a fundamental clock for the execution of programmed instructions. Typically, these internal oscillators are not precise and can be adjusted by means of an oscillator calibration register within the microcontroller.

Microprocessor manufacturers adjust these oscillator calibration registers at their factory to give a certain frequency of oscillation at nominal operating voltage and nominal room temperature. At other operating voltages, and other temperatures, the fundamental frequency of oscillation may deviate from the norm.

In certain applications, such as measuring the AC line frequency, it becomes essential to maintain a precise frequency of operation. This requires a precise frequency of oscillation. This may be achieved by performing a functional test, and subsequent calibration of the oscillator calibration register, within the motor control module containing the microprocessor or microcontroller.

The oscillator in microcontroller 430 of the control module 100 should be adjusted because the AC line frequency needs to be measured to determine if it is 50 Hz or 60 Hz, which are typical operating frequencies, or if the AC line frequency is at another, different frequency used to communicate with the module 100 for the purpose of loading and reading coefficients necessary for the proper operation of the power tool. Accordingly, an example implementation to calibrate the fundamental frequency of oscillation in microcontroller 430 is to count the number of oscillations between successive zero-crossings of the AC line which powers the control module 100. Either current or voltage can be sampled.

Microcontroller 430 includes counters that can count the fundamental frequency, which may be divided by some prescaler within the microcontroller 430. If the number of counts between successive zero-crossings is lower that expected, then the oscillator calibration register in microcontroller 430 is changed by writing a new value to the register so as to increase the frequency and thus increase the number of counts. If the number of counts between successive zero-crossings is higher that expected, then the oscillator calibration register is changed in such a way (such as by writing a new value to the register) as to decrease the frequency and thus decrease the number of counts between successive zero-crossings.

Accordingly, in a general example, the oscillator calibration register in the microcontroller 430 can be calibrated so that the fundamental frequency of oscillation enables precise measurement of the AC line frequency. For example, an initial oscillator calibration register value is set, and the number of frequency oscillations between successive zero crossings of the AC waveform is counted by software in microcontroller 430 to determine a count. This count can be compared against a nominal count value stored in memory of the microcontroller 430 (i.e., some threshold). If the count is less than the nominal count value, the oscillator calibration register is calibrated by the microcontroller 430 increasing the fundamental frequency of oscillation-in the oscillation register. If the count is greater than or equal to the nominal count value, the microcontroller 430 decreases the fundamental frequency of oscillation in the oscillation register.

The example embodiments being thus described, it will be obvious that the same may be varied in many ways. Such variations are not to be regarded as a departure from the example embodiments, and all such modifications as would be obvious to one skilled in the art are intended to be included within the scope of the appended claims.

What is claimed:

1. A motor control module configurable to control a given tool motor of a corded AC power tool powered by an AC supply voltage signal input thereto, the module comprising:
a triac for controlling current to the given tool motor, and
a controller for controlling a firing angle of the triac to control the amount of current applied to the tool motor, the controller having at least one digital input and including a digital blanking circuit for detecting voltage zero-cross signals in a given AC half-cycle of the AC supply voltage signal,
wherein the digital input digitizes the input AC supply voltage signal into a digital signal, and
wherein the digital blanking circuit detects valid zero-crosses in the digital signal by accepting a first zero cross transition of the AC supply, as represented in the digital signal, as a first valid zero cross signal in the given AC half cycle, rejecting additional zero crossings in the digital signal for a given blanking period, and then accepting a zero cross occurring at a next opposite polarity transition after the blanking period has elapsed as a next valid zero cross signal in the given AC half cycle.

2. The module of claim 1, wherein the detection of valid zero-crosses in a given AC half cycle enables the AC supply voltage signal to be synchronized with the control module so as to provide more precise firing angle control of the triac.

3. The module of claim 1, further comprising a filter for filtering the AC supply voltage signal prior to being input to the digital input of the controller.

4. The module of claim 1, wherein the digital blanking circuit detects valid zero-crosses for each half-cycle of the AC supply voltage signal so that only the first AC zero cross is used for each AC half-cycle.

5. The method of claim 1, wherein the given blanking period is variable to enable the control module to operate over a range of AC supply voltage frequencies.

6. In a power tool having a motor control module for controlling a tool motor thereof, a method of detecting voltage zero-cross signals in a given AC half-cycle of an AC supply voltage signal input to control module for powering the tool so as to synchronize the motor control module with the AC supply voltage signal, comprising:
  generating a digital signal in the control module from the AC supply voltage signal, wherein the control module has a digital input for digitizing analog inputs including the AC supply voltage signal thereto, and
  processing the digital signal in the control module to determine valid zero cross signals in the given AC half-cycle by accepting a first zero cross transition, as represented in the digital signal, as a first valid zero cross signal of the given AC half-cycle, rejecting additional zero crossings in the digital signal for a specified blanking period, and accepting a zero cross occurring at a next opposite polarity transition after the blanking period has elapsed as a next valid zero cross signal in the given AC-half cycle.

7. The method of claim 6, further comprising filtering the AC supply voltage signal prior to generating the digital signal.

8. The method of claim 6, further comprising repeating the generating and processing steps for each half-cycle of the AC supply voltage signal so that only the first AC zero cross is used for each AC half-cycle.

9. The method of claim 6, wherein the blanking period is variable to enable the control module to operate over a range of AC supply voltage frequencies.

10. The method of claim 6, wherein synchronization of the AC supply voltage signal with the control module enables improved firing angle control of the triac.

11. In motor control module of a corded AC power tool, the module having a triac to control current to a given tool motor, a method of estimating an average current flowing through the triac, comprising:
  sensing a positive-going zero-crossing of the AC voltage waveform powering the tool,
  sampling current through the triac at regular intervals to output a plurality of analog current values to be accumulated in a sum, and for each analog current value,
    converting the value into a digital value and subtracting an offset from the digital value to output an adjusted value, and
    adding only those adjusted values that are positive-valued to the accumulating sum, so that negatively-valued current values are ignored,
  sensing a negative-going zero-crossing of the AC voltage waveform to complete a measurement period, and
  dividing the sum of accumulated values after reaching the negative-going zero-cross by a given number of samples to determine the estimated average current for the measurement period.

12. The method of claim 11, wherein dividing further includes dividing the sum by a total of the non-negative valued samples taken within the measurement period.

13. The method of claim 11, wherein dividing further includes dividing the sum by all samples taken within the measurement period.

14. In motor control module of a corded AC power tool, the module having a triac to control current to a given tool motor, a method of estimating an average current flowing through the triac, comprising:
  sensing a positive-going zero-crossing of the AC voltage waveform,
  sampling current through the triac at regular intervals to output a plurality of analog current values, and for each analog current value,
    converting the value into a digital value and subtracting an offset from the digital value to output an adjusted value, and
    adding an absolute value of the adjusted value to an accumulating sum, so that adjusted values representing negatively-valued current samples are additive to the sum,
  sensing a negative-going zero-crossing of the AC voltage waveform to complete a measurement period, and
  dividing the sum of accumulated values after reaching the negative-going zero-cross by all samples taken within the measurement period to determine the estimated average current for the measurement period.

* * * * *

UNITED STATES PATENT AND TRADEMARK OFFICE
CERTIFICATE OF CORRECTION

PATENT NO. : 7,446,493 B2  Page 1 of 1
APPLICATION NO. : 11/545734
DATED : November 4, 2008
INVENTOR(S) : Michael K. Forster et al.

It is certified that error appears in the above-identified patent and that said Letters Patent is hereby corrected as shown below:

Title Page,
Item (54), Inventors (4th inventor), "Daniel R. Beers" should be --David R. Beers--.

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,446,493 B2 | Page 1 of 1 |
| APPLICATION NO. | : 11/545734 | |
| DATED | : November 4, 2008 | |
| INVENTOR(S) | : Michael K. Forster et al. | |

It is certified that error appears in the above-identified patent and that said Letters Patent is hereby corrected as shown below:

Title Page,
Item (75), Inventors (4th inventor), "Daniel R. Beers" should be --David R. Beers--.

This certificate supersedes the Certificate of Correction issued July 14, 2009.

Signed and Sealed this

Eighteenth Day of August, 2009

David J. Kappos
*Director of the United States Patent and Trademark Office*